US008245985B2

(12) United States Patent
Goetz

(10) Patent No.: US 8,245,985 B2
(45) Date of Patent: Aug. 21, 2012

(54) HOSE HANGER DEVICE

(75) Inventor: Michael H. Goetz, Berlin, PA (US)

(73) Assignee: Robert Bosch GmbH, Stuttgart (DE)

( * ) Notice: Subject to any disclaimer, the term of this patent is extended or adjusted under 35 U.S.C. 154(b) by 547 days.

(21) Appl. No.: 12/429,304

(22) Filed: Apr. 24, 2009

(65) Prior Publication Data
US 2010/0270440 A1 Oct. 28, 2010

(51) Int. Cl.
A62C 13/76 (2006.01)
(52) U.S. Cl. .......... 248/75; 368/10; 137/624.11; 248/89
(58) Field of Classification Search ............ 248/75, 248/89, 78, 682, 301, 213; 368/10; 137/624.11, 137/355.26, 355.16
See application file for complete search history.

(56) References Cited

U.S. PATENT DOCUMENTS

| | | | |
|---|---|---|---|
| D37,306 S | 1/1905 | Gibbs | |
| 955,260 A | 4/1910 | Getman | |
| 4,436,267 A * | 3/1984 | Eads et al. | 248/75 |
| 4,807,664 A | 2/1989 | Wilson et al. | |
| 5,205,521 A * | 4/1993 | Smith | 248/87 |
| 5,419,362 A * | 5/1995 | Blackaby | 137/355.16 |
| 5,445,176 A * | 8/1995 | Goff | 137/80 |
| D365,771 S | 1/1996 | Clivio | |
| 5,699,987 A | 12/1997 | Romaneschi et al. | |
| D408,270 S | 4/1999 | Tisbo et al. | |
| 6,079,675 A * | 6/2000 | Hsu | 248/75 |
| 6,238,139 B1 * | 5/2001 | Glang et al. | 405/135 |
| 6,337,635 B1 | 1/2002 | Ericksen et al. | |
| D467,187 S | 12/2002 | Clivio | |
| 6,488,240 B1 | 12/2002 | Brooker et al. | |
| D474,396 S | 5/2003 | Tisbo et al. | |
| 6,719,010 B1 * | 4/2004 | Yi-Chang | 137/624.11 |
| 7,810,515 B2 * | 10/2010 | Nies et al. | 137/78.3 |
| 8,104,509 B2 * | 1/2012 | Leer et al. | 137/624.11 |
| 8,132,592 B2 * | 3/2012 | Harrington et al. | 137/355.2 |
| 2002/0074462 A1 | 6/2002 | Pontecorvo | |
| 2008/0223951 A1 * | 9/2008 | Tracey et al. | 239/71 |
| 2008/0255708 A1 * | 10/2008 | Nies et al. | 700/284 |
| 2010/0163126 A1 * | 7/2010 | Leer et al. | 137/624.11 |
| 2011/0309274 A1 * | 12/2011 | Parsons et al. | 251/129.01 |

* cited by examiner

Primary Examiner — Terrell McKinnon
Assistant Examiner — Monica Millner
(74) Attorney, Agent, or Firm — Maginot, Moore & Beck

(57) ABSTRACT

A hose hanger device for use in combination with a water timer comprises a housing defining a hose support surface for supporting a hose coiled thereon, and a receptacle sized to receive the base assembly of the water timer therein with receptacle openings corresponding to the inlet and outlet of the base assembly. An opening is defined in the front face of the housing to permit passage of the base assembly therethrough for placement within the receptacle. The receptacle is configured to support the base assembly so that an input and display module may be removably mounted on the base assembly with the module substantially flush with the front face of the housing. The receptacle supports the base assembly with its outlet fitting accessible for engaging a water hose. An angled water conduit situated within the housing is coupled between the inlet fitting of the base assembly and a conduit segment connected to a hose bib.

18 Claims, 4 Drawing Sheets

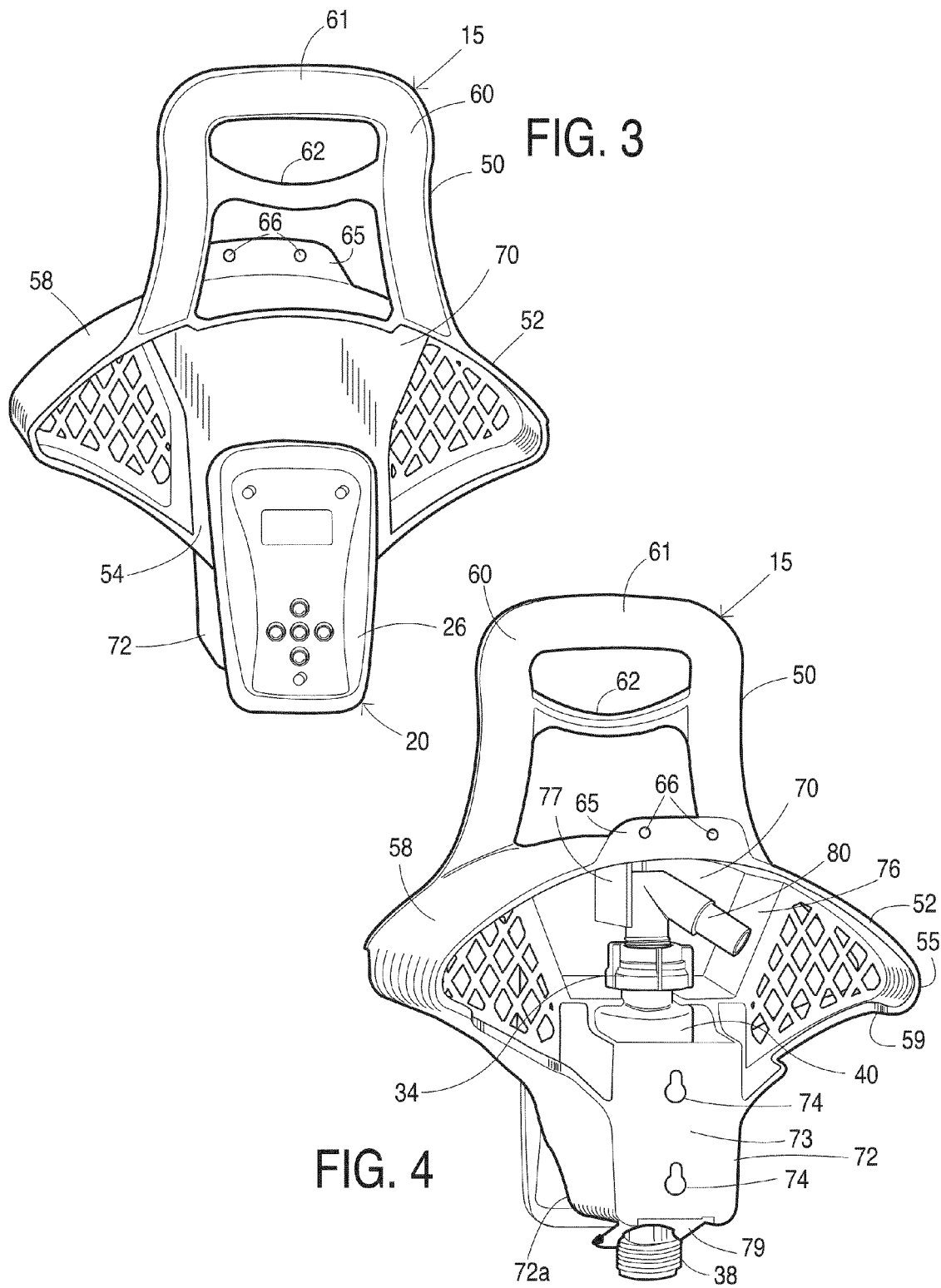

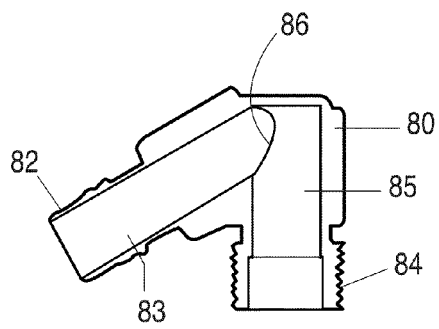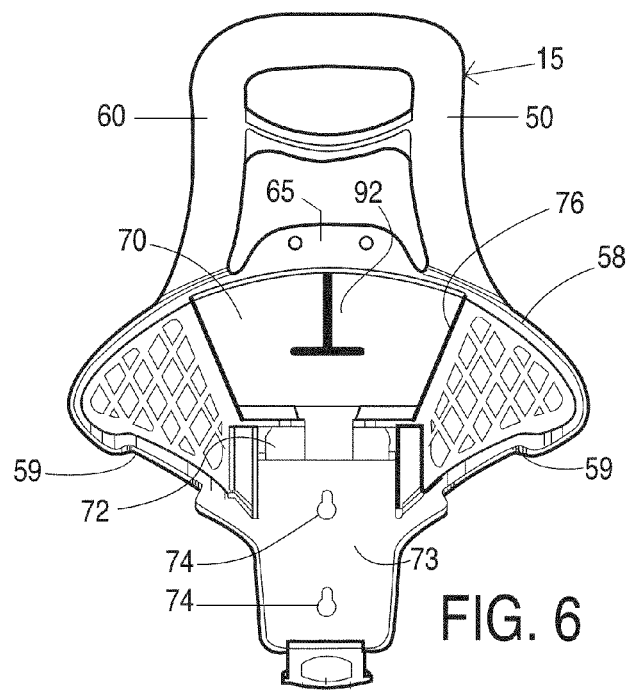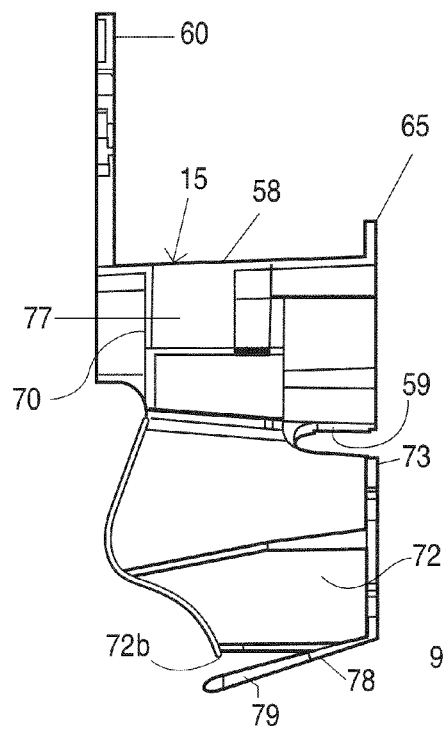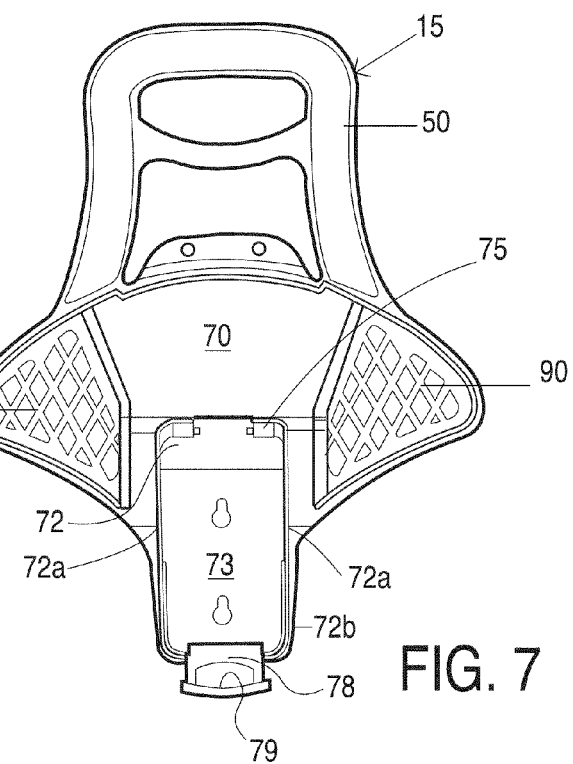

HOSE HANGER DEVICE

BACKGROUND

The present disclosure relates to devices for supporting a coiled hose, such as a garden hose, and particularly devices adapted to be mounted to a building or post.

Hose hangers are well-known devices that help organize and retain a hose, such as a garden hose, when it is not in use. The typical hose hanger device is configured so that the garden hose can be coiled about a surface that is supported or mounted on a building, such as a homeowner's house. The house hanger is usually mounted adjacent a hose bib so that the inlet end of the hose can be conveniently connected to the water source. The entire hose is coiled on the hose hanger for storage. Even during use, a certain portion of the hose may remain coiled on the hose hanger while the remaining portion is uncoiled for use.

Features are provided on some hose hangers that facilitate coiling and uncoiling the hose. Other types of hose hangers provide a storage compartment for storing a collection of spray nozzles or gardening tools, for instance. Some hose hangers are even mounted on a wheeled carriage to be conveyed throughout the grounds.

Another common gardening appliance is the water timer. The typical water timer is mounted to the outlet of the hose bib and includes a control valve that closes after a set period of time. The water timer thus avoids the problem of the forgetful or distracted gardener who leaves the hose bib turned on while watering the lawn or plants. One such water timer is disclosed in co-pending patent application Ser. No. 12/346,466, filed on Dec. 30, 2008 and entitled "WATER TIMER SYSTEM HAVING REMOVABLE INPUT AND DISPLAY MODULE" (the '466 Application), the disclosure of which is incorporated herein by reference. This improved water timer system is not bulky or cumbersome to handle, yet is constructed to withstand the outdoor elements for a long period of time. General aspects of the water timer disclosed in the '466 Application are shown in FIG. 1, it being understood that the details of the water timer can be obtained from the '466 Application itself.

As shown in FIG. 1, the water timer 20 includes a base assembly 22 and an input and display module 24 having a user interface panel 26. The panel 26 provides a visual display of the timing function of the timer 20 as well as user-input elements for activating and adjusting the timer.

The base assembly 22 includes a conduit structure 30 having an inlet 32 and an outlet 36. The inlet 32 may be provided with a female coupling 34, while the outlet may be provided with a male coupling 38. The inlet coupling 34 is configured to be threaded onto a standard hose bib, while the outlet coupling 38 is configured to engage a garden hose. The base assembly 22 further includes a housing structure 40 that houses a flow control valve and the mechanism for opening and closing that valve. The housing structure 40 is provided with attachment or support elements 44 that are configured to removably support the module 24 thereon. The module thus includes mating posts or prongs 48 that are configured to firmly but removably engage the attachment elements 44. The module 24 can thus be removed to service the flow control valve mechanism within the housing structure 40 or to service the electrical components 49, such as a battery, carried by the module 24.

The water timer 20 disclosed in the '466 Application thus provides a "user-friendly" apparatus that is easy to install and use. The timer is configured so that the input and display module 24 is tilted upward for easy access by the user when the timer 20 is mounted to the hose bib. The removability of the module 24 from the housing structure 40 facilitates the service, repair or replacement of the module or its electrical components.

The water timer 20 thus provides a significant improvement over prior timer systems. However, the timer 20 is, like other similar devices, intended to be mounted to the hose bib or directly to the hose itself. Although convenient, mounting the timer to the hose bib can expose the timer to damage from impact by gardening or landscaping tools, for instance. More significantly, impact on the water timer may damage the hose bib or gradually loosen the bib from its mount.

Moreover, mounting the water timer on the hose bib may limit the functionality of the hose bib or the timer. For instance, it may be necessary to completely remove the timer when it is desired to connect a different hose to the hose bib. Moreover, in some cases the hose bib is not fully accessible to the user either due to its placement on the building or house, or due to the presence of vegetation that obstructs and obscures. In some cases, the hose bib is only accessible to turn the valve handle off or on. In those cases, a timer such as the timer 20 of FIG. 1 would be difficult to operate and certainly difficult to see. There is a need for a device that can overcome these difficulties.

SUMMARY

To address this need, a hose hanger device is provided for use in combination with a water timer. The water timer includes a base assembly having a conduit structure defining an inlet with an inlet fitting, an outlet with an outlet fitting and a valve mechanism therebetween operable to prevent or enable water flow through the conduit structure, and an input and display module removably mounted on the base assembly and having an input and display panel configured to provide input signals to timer circuitry for controlling the valve mechanism in response to user actuation and to display indicia relating to an operating state of the water timer.

In one embodiment, the hose hanger device comprises a housing defining a hose support surface for supporting a hose coiled thereon, the housing including a front face and an opposite back face. A receptacle is provided between the front and back faces, the receptacle sized to receive the base assembly of the water timer therein. Receptacle openings correspond to the inlet and outlet of the base assembly when the base assembly is disposed within the receptacle. The receptacle is configured so that the outlet fitting of the base assembly is accessible for engagement to a garden hose, for example.

An opening is defined in the front face of the device in communication with the receptacle. The opening is sized to permit passage of the base assembly therethrough for placement within the receptacle. The receptacle is sized to support the base assembly of the water timer so that the input and display module may be removably mounted on the base assembly with the module substantially flush with the front face of the housing.

In one aspect, the receptacle includes a bottom wall defining a bottom one of the receptacle openings and a tab extending across the receptacle opening. The tab defines a hole sized to receive a fitting of the base assembly of the water timer therethrough when the base assembly is disposed within the receptacle. The tab may be resiliently deflectable to facilitate placement of the base assembly of the water timer within the timer receptacle.

In a further aspect, a top one of the receptacle openings is sized to receive a top portion of the base assembly of the water timer, including a fitting of the base assembly, therethrough. The front face of the housing includes a front panel arranged to conceal the top portion of the base assembly behind the front panel. A water conduit may be provided having a first fitting adapted to engage the fitting of the base assembly, a second fitting configured for fluid engagement with a hose, and a flow passageway between the first and second fittings and defining a non-linear angle therebetween. The water conduit is also concealed behind the front panel. In a specific embodiment, the non-linear angle of the flow passageway is about 60 degrees. The housing defines a notch beneath the hose support surface that is sized to receive a hose therethrough when the hose is engaged to the second fitting of the water conduit.

One benefit of the hose hanger device disclosed herein is that it eliminates the need for mounting a water timer to a hose bib. Another benefit is that it retains the full functionality of the water timer, while protecting the timer.

DESCRIPTION OF THE FIGURES

FIG. 3 is a front perspective view of the hose hanger device shown in FIG. 2.

FIG. 4 is a rear perspective view of the hose hanger device shown in FIG. 2.

FIG. 5 is a side cross-sectional view of a water conduit for use with the hose hanger device shown in FIG. 2.

FIG. 6 is a rear elevational view of the hose hanger device shown in FIG. 2.

FIG. 7 is a rear elevational view of the hose hanger device illustrated in FIG. 2.

FIG. 8 is a side cross-sectional view of the hose hanger device shown in FIG. 7.

DESCRIPTION OF THE EMBODIMENTS

Figure 1:
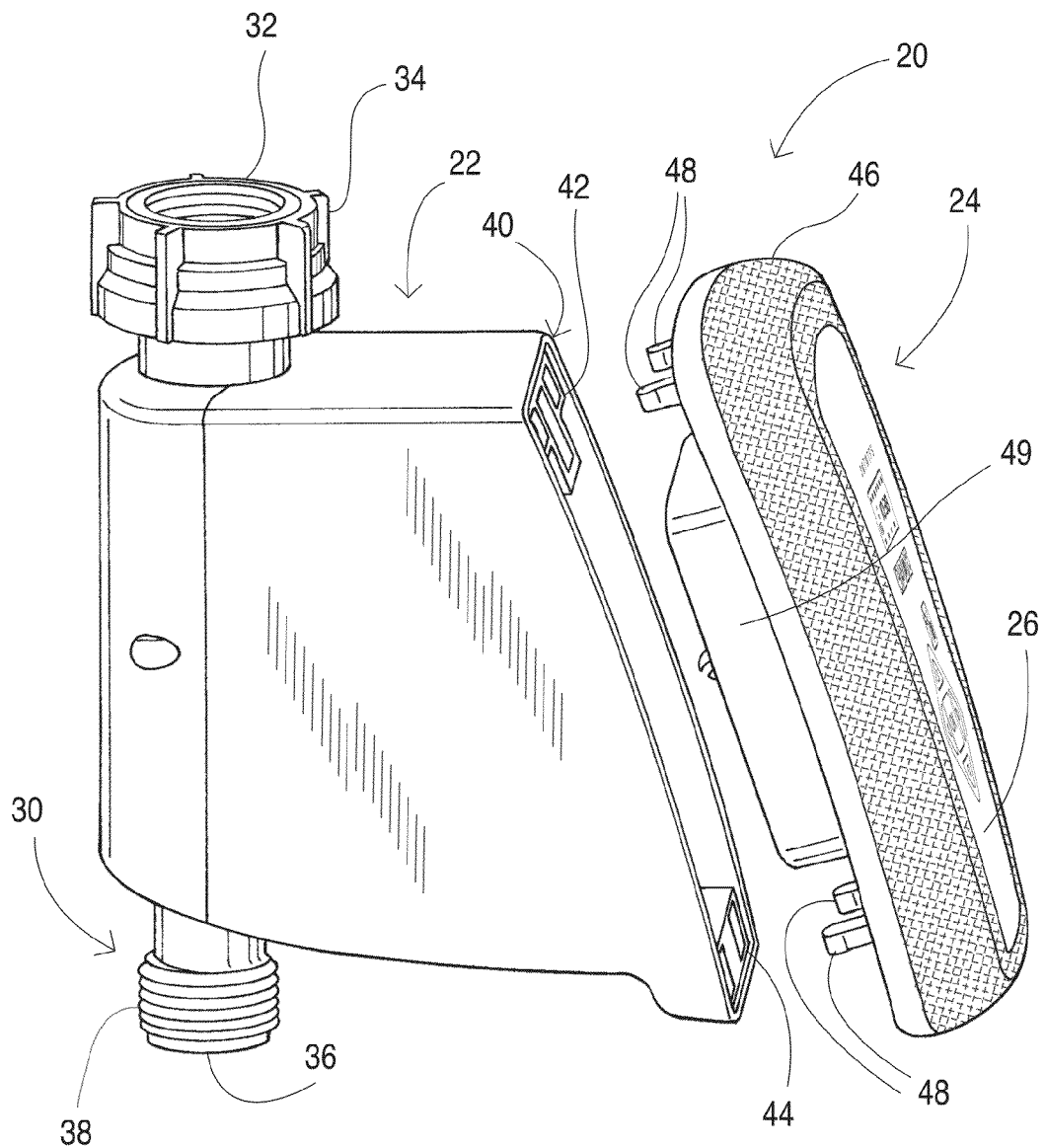
FIG. 1 is a perspective exploded view of a water timer for use with the hose hanger device disclosed herein.

While the hose hanger device herein is susceptible to various modifications and alternative forms, specific embodiments thereof have been shown by way of example in the drawings and will herein be described in detail. It should be understood, however, that there is no intent to limit the hose hanger device to the particular forms disclosed, but on the contrary, the intention is to cover all modifications, equivalents, and alternatives falling within the spirit and scope of the invention as defined by the appended claims.

Figure 2:
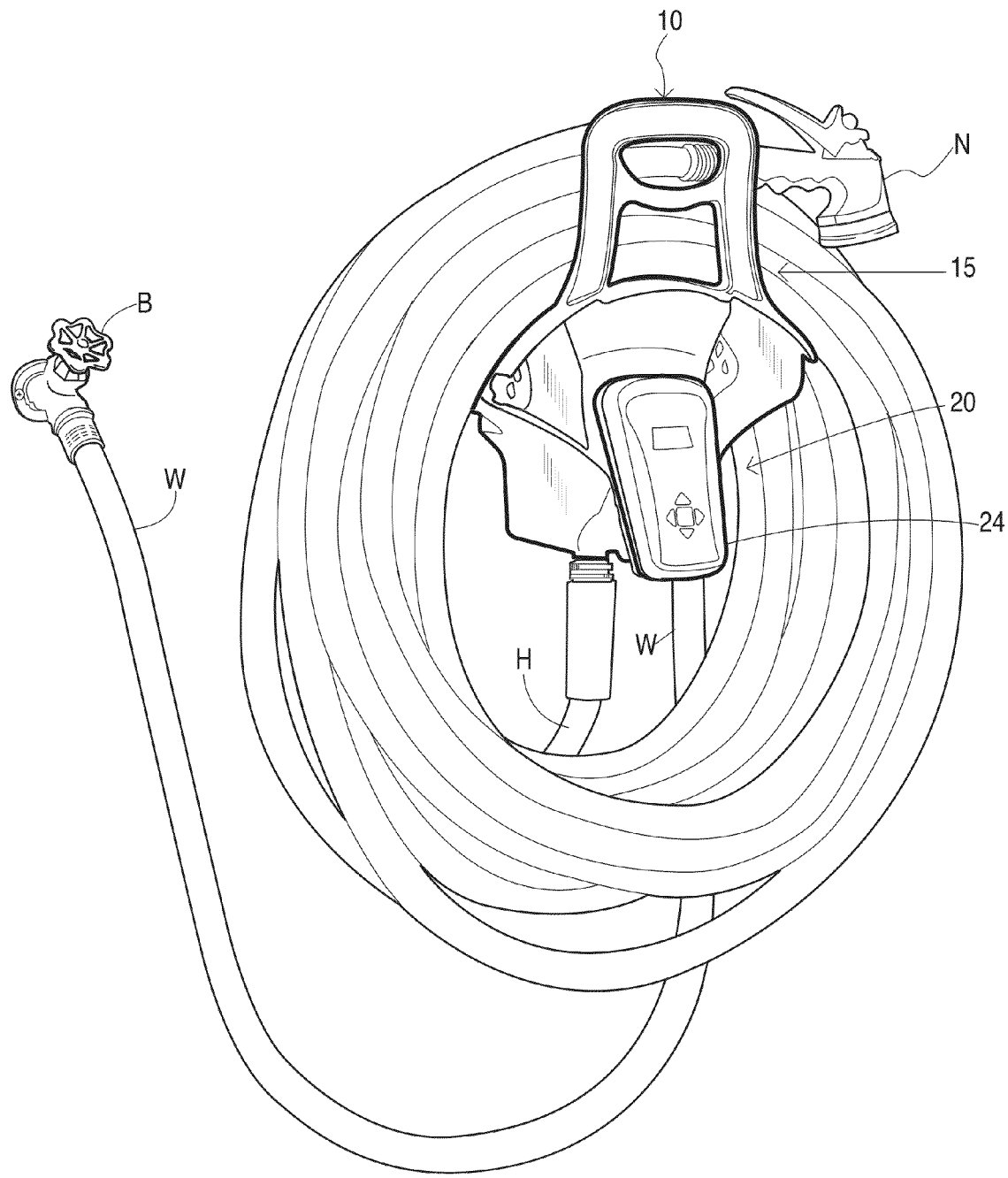
FIG. 2 is a front perspective view of one embodiment of a hose hanger device in its operational configuration.

A water hose system 10 is shown in FIG. 2 that comprises a hose hanger device 15 in its operational configuration. The hose hanger 15 is shown mounted to a building, such as a house, adjacent a hose bib B. The hose hanger device 15 supports a hose H, such as a garden hose, with or without the nozzle N. The device 15 further supports a water timer 20, which may be configured as shown in FIG. 1 and as described in pending application Ser. No. 12/346,466 discussed above, the disclosure of which is incorporated herein by reference. The water timer 20 is connected at its outlet to the garden hose H and at its inlet to a water conduit segment W, which segment is connected to the hose bib B.

As illustrated in FIG. 2 that the hose hanger device 15 disclosed herein conveniently supports the water timer 15 as well as the garden hose H adjacent the hose bib B, but does not require that the water timer be threaded onto the hose bib. The hose hanger device also supports the water timer 20 so that its display and input module 24 can be readily viewed and accessed by the user. It can thus be appreciated that the hose hanger device disclosed herein avoids the problems associated with prior water timers, namely the need to mount the timer on the water bib and the potential for limited access and visibility. A concomitant benefit is that the hose H helps protect the water timer 20 mounted to the hose hanger device 15 by encircling the timer when the hose is coiled onto the device.

Details of the hose hanger device are shown in FIGS. 3-8. The device 15 includes a frame 50 that that forms a housing 52. The water timer 20 is visible at the front face 54 of the housing 52 while the rear face 55 of the housing provides features for mounting the device 15 to a building or house. The housing 52 may be generally arcuate or elliptical in shape to form a hose support surface 58 onto which the hose H may be coiled. The hose support surface 58 is configured in a conventional manner to allow the hose to be readily coiled without kinking. The surface 58 has a depth between the front and rear faces 54 and 55, respectively, that can support multiple coils of the house adjacent each other. Of course, the depth of the surface 58 may be defined by the length and diameter of hose intended to be supported by the hose hanger 15.

The front face 54 of the hose hanger device 15 extends into a front panel 60 that projects above the hose support surface 58. The height of the front panel relative to the support surface 58 defines the number of hose coils that can be stacked onto each other, and ultimately sets the length of hose H that can be effectively accommodated by the device 15. It is desirable that the height of the front panel 60 be restricted to avoid coiling an excessive amount of hose on the device 15, which may compromise the mounting of the device to the building or house. By way of example, the front panel 60 may have a height of four inches above the hose support surface 58.

The front panel 60 may define a hand grip 61 to facilitate carrying the device 15. The panel may further define a nozzle support 62 onto which one or more spray nozzles, such as the nozzle N in FIG. 2, may be supported when not in use.

The hose hanger device 15 may be mounted to a building or post in a conventional manner. In the embodiment shown in FIGS. 3-4, the rear face 55 defines a mounting flange 65 with mounting holes 66 sized to receive an anchoring element, such as a screw or anchor bolt. The device further preferably includes offset mounting holes, such as the holes 74 defined in the rear plate 73. The holes 74 are configured with a portion sized to accept the head of an anchoring element and another portion sized to prevent passage of the head, in a known manner. The hose hanger device 15 may be mounted in a known manner by first fixing a pair of anchor elements in alignment with the position of the offset mounting holes 74. The frame 50 of the hose hanger device is mounted onto the heads of the first pair of anchor elements. A second pair of anchor elements may be driven into the building or post through the mounting holes 66 to complete the mounting of the device 15.

As thus far described, the hose hanger device 15 is similar to known hose hangers configured to simply support a hose on a building. However, in the embodiments disclosed herein, the hose hanger device 15 defines a timer receptacle 72 between the front and rear faces 54, 55. The receptacle is formed in part by the rear plate 73, with side walls 72a and a partial bottom wall 72b. The receptacle 72 is sized and shaped to receive the base assembly 22 of the water timer 20 (FIG. 1). As shown in FIG. 4, the top of the receptacle 72 is open so that the inlet 32 and female fitting 34 of base assembly 22 can project above the receptacle for access. The inlet and fitting are concealed behind front panel 70.

The base assembly 22 of the water timer fits tightly between the side walls 72a and is supported by the partial bottom wall 72b. The bottom wall 72b is open with a tab 78 projecting forward beneath the opening. The tab 78 defines a hole 79 that is sized to receive the outlet 36 and male fitting 38. In one embodiment, the tab 78 is resiliently flexible so that the tab may be deflected downward when the base assembly 22 of the water timer is placed within the opening 75 in the front face 54 of the housing 52. Once the base assembly is seated within the receptacle 72 the tab 78 may be flexed upward over the male fitting 36. In certain embodiments, the hole 79 may be sized to engage the threads of the male fitting 36 to help solidly retain the base assembly within the receptacle.

The opening 75 is sized to allow the base assembly 22 to be introduced into the receptacle 72 from the front of the housing 52. This feature allows the water timer to be removed and/or replaced even when the hose hanger device 15 is mounted to the building.

As shown in FIG. 3, the front view of the hose hanger device 15 does not reveal the contents of the timer receptacle or the components behind the front panel 70. In particular, the opening 75 through which the base assembly 22 of the timer is inserted is covered by the input and display module 24 of the timer. The prongs 48 of the module 24 are able to engage the attachment elements 44 of the base assembly. It can thus be appreciated that the timer receptacle 72 is configured to allow the attachment elements 44 to be situated generally flush with the plane of the opening 75, to thereby allow full engagement of the prongs 48 with the elements 44. The module 24 may thus be easily removed and replaced as necessary without having to remove the base assembly 22 from the housing 52. This configuration of the timer receptacle also allows the input and display module 24 to reside substantially flush with the front face 54 of the housing 52. In some embodiments, a gasket or seal may be disposed between the module and the front face of the housing to help seal the opening 75.

As best seen in FIG. 4, the housing 52 defines a recess 76 behind the front panel 70. When the water timer base assembly 22 resides within the receptacle 72, the inlet fitting 34 is situated within the recess 76. Since the inlet 32 is facing upward in this orientation of the base assembly, the hose hanger device 15 further comprises a water conduit 80 that allows connecting the conduit segment W to the inlet 32. As shown in more detail in FIG. 5, the conduit 80 includes an inlet fitting 82 feeding an inlet passageway 83, and an outlet fitting 84 at the end of the outlet passageway 85. The two passageways intersect within the body of the conduit at an angle intersection 86. This intersection diverts the water flowing through the inlet passageway into the outlet passageway and into the inlet 32 of the water timer. The angle of the intersection 86 is arranged so that the conduit segment W can pass through a notch 59 on either side of the housing 52 when the outlet fitting 84 is engaged to the inlet fitting 34 of the water timer. In one embodiment, the angle is about 60 degrees, so that the inlet fitting 82 faces downward when the outlet fitting 84 is engaged to the water timer. In the illustrated embodiment, the outlet fitting 84 includes male threads to engage the female threaded fitting 34. The inlet fitting 84 in the illustrated embodiment may be a barbed fitting, or other fitting configured for press-fit and/or hose clamp connection to the outlet end of the conduit segment W.

The housing 52 is provided with a notch 59 on either side of the hose hanger device 15 to account for the location of the hose bib B, to which the conduit segment W is connected, relative to the placement of the hose hanger device 15. The housing 52 further defines a bracket 92 that projects interiorly from the front panel 70 toward the water conduit 80. The bracket 92 acts as a "backstop" in the event that the water conduit 80 is impacted, to prevent damage either to the conduit or to the interface between the fittings 34 and 84. The bracket thus prevents excess deflection of the water conduit if it is impacted. The bracket 92 also helps retain the base assembly 22 within the timer receptacle 72.

The hose hanger device 15, and particularly the frame 50, is suitable to be formed of plastic in an injection mold process. The exterior surfaces of the frame may be arcuate to add rigidity and strength to the device. A lattice 90 may be formed across the front face 54 outboard of the front panel 70 to add further rigidity to the structure. The lattice 90 further provides air flow into the interior of the housing 52 to allow water to evaporate that might otherwise collect within the housing 52.

There is a plurality of advantages arising from the various features of each of the embodiments of the hose hanger device described herein. It will be noted that alternative embodiments of the hose hanger device may not include all of the features described yet still benefit from at least some of the advantages of such features. Those of ordinary skill in the art may readily devise their own implementations of the hose hanger device that incorporate one or more of the features and fall within the spirit and scope of the present invention as defined by the appended claims.

For instance, the timer receptacle 72 may be configured differently depending upon the configuration of the water timer 20. In the illustrated embodiment, the receptacle is configured to support the water timer 20 with the inlet fitting 34 facing upward and the outlet fitting 36 facing downward. This orientation may be desirable so that the hose H may be engaged to the outlet fitting 36 and then coiled over the hose support surface 58 without kinking. This orientation also leaves the outlet fitting 36 readily accessible while remaining somewhat protected underneath the housing 52. However, the timer receptacle may be configured so that the orientation of the inlet and outlet fittings is modified in accordance with the configuration of the water timer, such as with the inlet and outlet extending laterally.

In the illustrated embodiment the hose hanger device 15 is configured to be mounted on a vertical wall of a building, such as a house. Alternatively, the device may be incorporated into a free-standing carriage that can be moved to different locations. With this alternative, the water conduit segment W could have a length sufficient to provide a significant range of motion of the carriage supported hose hanger device relative to the hose bib B.

It is further contemplated that the fittings described herein, such as fittings 34, 36 of the water timer and fittings 83, 84 of the water conduit may be of a variety of types, provided that the fittings are capable of a sufficiently water-tight engagement. The fittings may be of the type that do not require tools to engage for lighter duty applications, or that require tools for heavier duty applications.

The embodiment of the hose hanger device 15 disclosed herein may be provided for residential use, and is therefore well-suited for lightweight plastic construction. The device may further be molded as a single unitary piece. For heavier duty applications the device 15 may be formed of heavier grade materials and may be assembled from separate components.

What is claimed is:

1. A hose hanger device for use in combination with a water timer including a base assembly having a conduit structure defining an inlet with an inlet fitting, an outlet with an outlet fitting and a valve mechanism therebetween operable to prevent or enable water flow through the conduit structure, and an input and display module removably mounted on the base assembly and having an input and display panel configured to provide input signals to timer circuitry for controlling the valve mechanism in response to user actuation and to display indicia relating to an operating state of the water timer, said hose hanger device comprising:

a housing defining a hose support surface for supporting a hose coiled thereon, said housing including a front face and an opposite back face, and further including a wall extending between said front face and said back face;

a receptacle between said front and back faces and said wall, said receptacle sized to receive the base assembly of the water timer therein and said wall arranged to support the base assembly of the water timer, said receptacle further defining receptacle openings corresponding to the inlet and outlet of the base assembly when the base assembly is disposed within said receptacle, one of said receptacle openings defined in said wall; and an opening defined in said front face and communicating with said receptacle, said opening sized to permit passage of the base assembly therethrough for placement within said receptacle, wherein said receptacle is sized to support the base assembly of the water timer so that the input and display module may be removably mounted on the base assembly with the module substantially flush with said front face of said housing.

2. The hose hanger device of claim 1, wherein said receptacle includes
a tab extending across said one of said receptacle openings, said tab defining a hole sized to receive one of the inlet fitting and outlet fitting of the base assembly of the water timer therethrough when the base assembly is disposed within said receptacle.

3. The hose hanger device of claim 2, wherein said tab is resiliently deflectable relative to said receptacle opening.

4. The hose hanger device of claim 1, wherein:
the other of said receptacle openings is sized to receive a top portion of the base assembly of the water timer, including a fitting of the base assembly, therethrough; and
said front face of said housing includes a front panel arranged to conceal the top portion of the base assembly behind said front panel.

5. The hose hanger device of claim 1, wherein:
the other of said receptacle openings is sized to receive a top portion of the base assembly of the water timer, including a fitting of the base assembly, therethrough; and
said hose hanger device further comprises a water conduit having a first fitting adapted to engage a fitting of the base assembly, a second fitting configured for fluid engagement with a hose, and a flow passageway between said first and second fittings and defining a non-linear angle therebetween.

6. The hose hanger device of claim 5, wherein said non-linear angle is about 60 degrees.

7. The hose hanger device of claim 5, wherein said housing defines a notch beneath said hose support surface, said notch sized to receive a hose therethrough when the hose is engaged to said second fitting of said water conduit.

8. The hose hanger device of claim 5, wherein:
said front face of said housing includes a front panel arranged to conceal said water conduit behind said front panel; and
said housing defines a bracket extending rearward from a rear surface of said front panel toward said water conduit to support said conduit.

9. The hose hanger device of claim 1, wherein said housing includes a lattice between said hose support surface and said receptacle.

10. A hose hanger device for use with a water timer including a base assembly having a conduit structure defining an inlet, an outlet and a valve mechanism therebetween operable to prevent or enable water flow through the conduit structure, and an input and display module removably mounted on the base assembly with a user interface panel, said hose hanger device comprising:

a housing defining a hose support surface for supporting a hose coiled thereon, said housing including a front face and an opposite back face, and further including a wall extending between said front face and said back face;

a receptacle between said front and back faces and said wall, said receptacle sized to receive the base assembly of the water timer therein and said wall arranged to support the base assembly of the water timer, said receptacle further defining receptacle openings corresponding to the inlet and outlet of the base assembly when the base assembly is disposed within said receptacle, one of said receptacle openings defined in said wall; and an opening defined in said front face and communicating with said receptacle, said opening sized to permit passage of the base assembly therethrough for placement within said receptacle, wherein said receptacle is sized to support the base assembly of the water timer so that the input and display module may be removably mounted on the base assembly with the module substantially flush with said front face of said housing.

11. The hose hanger device of claim 10 in which one of the inlet and outlet of the water timer base assembly includes a fitting, wherein said receptacle includes a tab extending across said one of said receptacle openings, said tab defining a hole sized to receive the fitting of the base assembly therethrough when the base assembly is disposed within said receptacle.

12. The hose hanger device of claim 11, wherein said tab is resiliently deflectable relative to said receptacle opening.

13. The hose hanger device of claim 10, wherein:
the other of said receptacle openings is sized to receive a top portion of the base assembly of the water timer therethrough; and
said front face of said housing includes a front panel arranged to conceal the top portion of the base assembly behind said front panel.

14. The hose hanger device of claim 10, wherein:
the other of said receptacle openings is sized to receive a top portion of the base assembly of the water timer therethrough; and
said hose hanger device further comprises a water conduit having a first fitting adapted to engage one of the inlet or outlet of the base assembly, a second fitting configured for fluid engagement with a hose, and a flow passageway between said first and second fittings and defining a non-linear angle therebetween.

15. The hose hanger device of claim 14, wherein said non-linear angle is about 60 degrees.

16. The hose hanger device of claim 14, wherein said housing defines a notch beneath said hose support surface, said notch sized to receive a hose therethrough when the hose is engaged to said second fitting of said water conduit.

17. The hose hanger device of claim 16, wherein:
said front face of said housing includes a front panel arranged to conceal said water conduit behind said front panel; and
said housing defines a bracket extending rearward from a rear surface of said front panel toward said water conduit to support said conduit.

18. The hose hanger device of claim 10, wherein said housing includes a lattice between said hose support surface and said receptacle.

* * * * *